May 3, 1955 F. J. KENT 2,707,388
PIPE TESTING MACHINES
Filed May 6, 1950 2 Sheets-Sheet 2

INVENTOR.
FRANCIS J. KENT
BY
Pollard & Johnston
ATTORNEYS

United States Patent Office 2,707,388
Patented May 3, 1955

2,707,388

PIPE TESTING MACHINES

Francis J. Kent, Forest Hills, N. Y., assignor to Hydropress, Incorporated, New York, N. Y., a corporation of Delaware Application May 6, 1950, Serial No. 160,503

7 Claims. (Cl. 73—37)

This invention relates to hydraulic testing machines and the like and especially to a hydraulic seal arrangement suitable for use in such machines.

The invention will be described particularly in conjunction with a testing machine suitable for testing a tube or the like with fluid pressure, such a testing machine being illustrated, for example, in copending application, Serial No. 139,559, filed January 20, 1950, now Patent No. 2,671,338.

In a testing machine of the type involved, the sealing heads have apertures or members receiving the ends of the pipe to be tested, it being necessary to seal the pipe relative to said sealing heads when fluid pressure is fed to the interior of the pipe. A difficult problem is encountered with hydraulic packings involved for sealing the round elements, inasmuch as the diameter of the elements will vary within certain limits.

The invention will be described in conjunction with an outside sealing head having an aperture into which the pipe end is inserted, but the invention also can be used in conjunction with an inside sealing arrangement. The support members for the packings usually are of metal and must have a larger diameter than the largest pipe to be sealed so as to allow passage of the pipe therethrough. It is apparent that a gap or annular space will be left between the metal backing member arrangement when the smallest tube or element to be tested is placed therethrough, but the packing must engage the smallest element closely. Under these conditions, there is a danger of the packing being extruded through the gap because of the high pressures involved in the testing.

Another problem is that the inside diameter of the packing must be large enough to permit introduction of the largest tube without danger to the packing, but the packing must closely engage the smallest tube to be tested in order to prevent leakage, when fluid pressure is applied.

One of the objects of the invention is to provide a sealing arrangement which properly will hold the hydraulic packing and prevent extrusion thereof under high pressure.

Another object of the invention is to provide a packing in conjunction with a source of pressure for the purpose of causing the packing to engage tubes of varying diameters and yet permit insertion of the tube in the sealing head without damage to the packing.

Still another object of the invention is to provide a flexible packing in conjunction with an arrangement for providing an adequate pressure to compress said packing, said pressure being higher, in some instances, than that used or present in testing the tube.

In one aspect of the invention, the sealing head has a flexible packing in the form of a ring composed of rubber or the like, and a metal or inflexible material segmental backing ring having a plurality of sectors, segments, or sections placed outside of the packing. It is desirable to have the sectors of the ring equally distributed around the tube especially when tubes of relatively large size are involved. In order to accomplish this, the sectors of the ring can be connected by suitable loosely mounted links and a yieldable means encircling the sections employed to draw the sectors together. Preferably, a relatively large number of sectors are used so as to reduce the distance between individual elements to as small a distance as possible. A solid ring or disc, having an inner diameter only slightly larger than the largest tube to be tested, preferably is placed between the hydraulic packing and segmental backing ring. With such an arrangement, the only space through which the packing could be extruded will be the small area which lies between the adjoining separated edges of the sectors and is between the inner diameter of the solid ring and the tube.

In a further aspect of the invention, sealing pressure for the packing ring can be supplied from the testing fluid or from a hydraulic intensifier or booster. At the beginning of application of pressure, it may be particularly desirable to provide a source of higher pressure than the testing pressure for compressing or expanding the packing so as to properly effectuate the seal.

In a further aspect, after the initial steps, the pressure testing fluid can be employed or the pressure intensifier can be used throughout the procedure.

As mentioned, it is to be understood that the invention also could be used in conjunction with an internal sealing head arrangement, in such event, the sections of the ring being expanded outwardly against the interior of the pipe or tube being tested. It also is to be understood that the device may be used for purposes other than testing machines, where similar sealing problems are involved.

Other advantages, features, and objects of the invention will become apparent from the following description and drawings which are merely exemplary:

Figure 1:
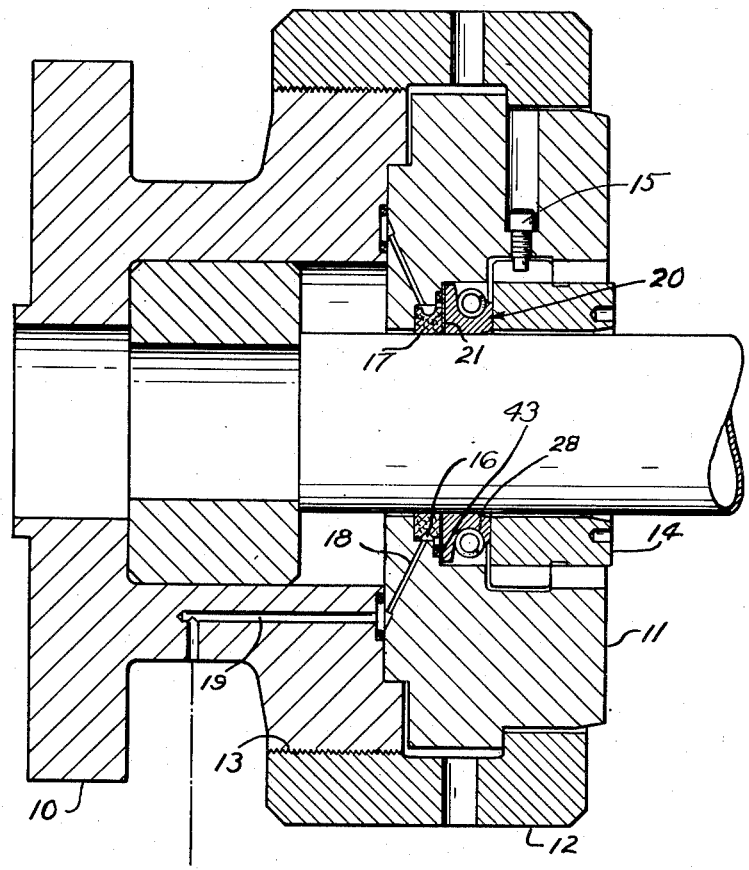
Fig. 1 is a sectional view with a schematic showing of the manner in which the booster can be connected thereto.

The sealing head at one end of a hydraulic pipe testing machine will be described, although it is to be understood that the invention may be used on various types of sealing heads and for various kinds of machines.

Body 10 may have a packing holder 11 held in place thereon by means of coupling nut 12, said nut being screw threadedly engaged at 13 with body 10. Packing holder 11 carries a packing retainer 14, said packing retainer being held in packing holder 11 by means of a conventional bayonet type joint. Stop pin 15 is engageable with a wing or portion of the packing retainer 14 to hold it in place after it has been inserted into the packing holder 11.

Packing 17 is held in an annular recess in packing holder 11. The hydraulic packing is in the form of a ring and preferably is of a flexible material, such as rubber, or the like. An annular ring 16 may be formed therein so that pressure can be applied at the exterior surface of the hydraulic packing 17 through passage 18, 19 in a manner which will be described hereafter. As explained previously, the inside diameter of the hydraulic packing preferably should be larger than the largest tube or element to be inserted into the sealing head, so that there will be no damage done to the packing when the tube is inserted.

An O ring 43 (Fig. 1) is located exteriorly of the hydraulic packing and in a suitable groove to prevent the escape of pressure fluid in the region of the outer circumference.

Segmental or split annular packing retainer ring 20 is held in place by the packing retainer 14. Preferably, a solid ring or disc 21 is located between the hydraulic packing 17 and the segmental or split annular ring 20. The interior opening in the solid ring 21 is made slightly larger than the largest element to be tested.

Figures 2, 3:
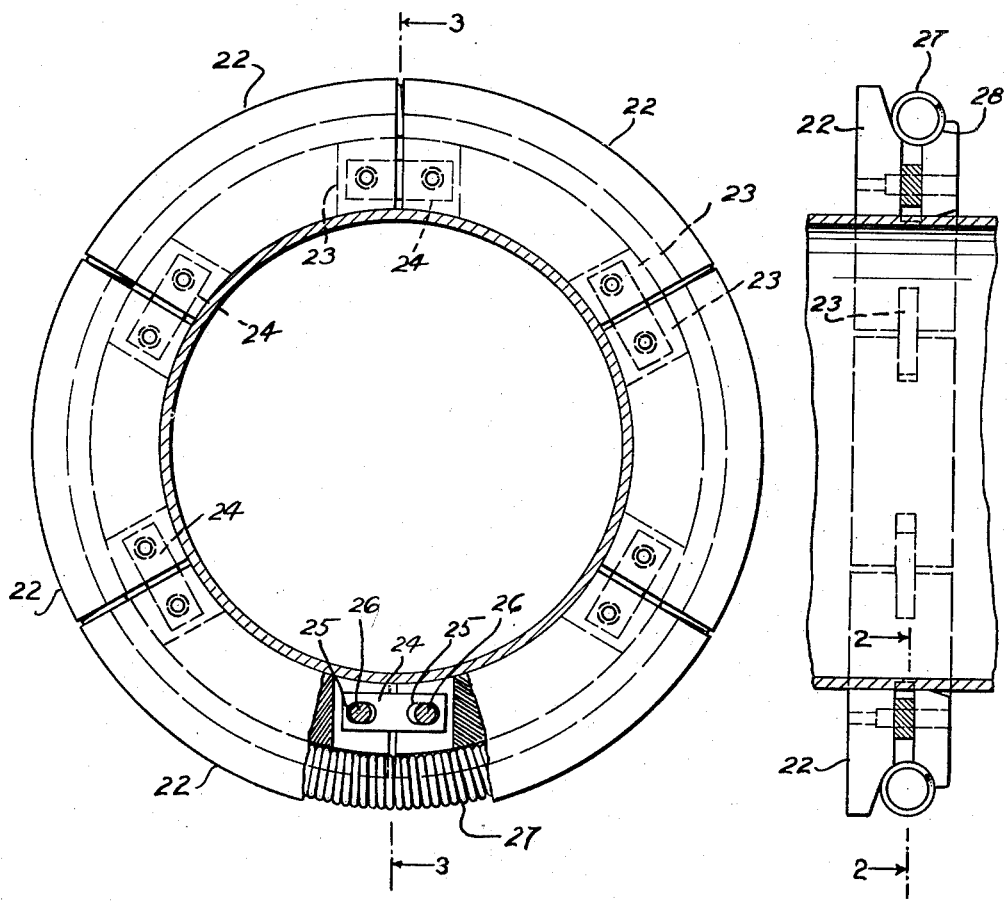
Fig. 2 is an enlarged view of the segmental packing retainer ring with a segment thereof cut away along the line 2—2 of Fig. 3.
Fig. 3 is a section taken along the line 3—3 of Fig. 2.

Segmental annular ring 20 may be composed of a plurality of segments 22 (Figs. 2, 3). The segments have slots 23 cut in the edges thereof for receiving links 24 connecting adjacent ends of the segments. The links 24 have elongated slots 25 adjacent each end thereof through which connecting pins 26 pass. Thus, the links are loosely mounted relative to the segments and will serve to maintain the space between the various segments substantially the same so that they are substantially evenly distributed around the circumference of the pipe. The movement is limited to the extent defined by the length of the slots 25.

Spiral or "garter" spring 27 is carried in the annular seat 28 cut in the exterior face of the segments, spring 27 serving to draw the segments together, but being yieldable when a tube or pipe is fed therethrough.

Preferably a relatively large number of segments are used so that the individual gaps between the segments will be relatively small. Also, it is desirable that the segments be equally distributed and of equal size. The number of segments used will depend on the size of the tube or pipes to be sealed. For example, in the case of pipes up to about 7 inches outside diameter, four segments can be employed, whereas six sections can be used for larger pipes.

It is thus apparent that the segments will rather closely engage the exterior surface of the pipe to be tested and that the solid backup ring between the hydraulic packing and the segmental ring will cover the relatively small gaps between the segments. The only areas not covered will be the small areas between the inside of the solid backup ring and the exterior face of the pipe located between the edges of adjacent segments. If an inside sealing arrangement (not shown) is involved, the segments and packing would be arranged to be moved outwardly into contact with the interior of the pipe. Adjacent segments also may come into contact with each other.

Preferably, a pressure intensifier or booster is connected to the packing so as to compress it during the first stages of the testing cycle, thereafter the pressure water being used to bear directly upon the packing through the check valve arrangement to be described. In some instances and when required, the sealing pressure can be obtained from the intensifier throughout the testing operation.

When the sealing pressure is to be furnished from an intensifier, one form of device is illustrated schematically in Fig. 1. High pressure air is fed from a control valve through pipe 30 to the low pressure intensifier cylinder 31, forcing the piston therein downwardly so as to compress the fluid in high pressure intensifier cylinder 32. The high pressure cylinder is connected through line 33, check valve 34, and line 35 with passage 19 leading to the hydraulic packing 17. At the same time that air pressure is admitted to the upper part of low pressure cylinder 31, control cylinder 36 receives air so as to close port 37 in relief valve 38 to prevent release of pressure through pipe 39 and valve 38. After the initial stages during the first admission of water to the pipe, the test water can be connected through line 40, check valve 41 and line 35 to the packing. Check valve 34 will prevent the pressure from line 40 feeding back to cylinder 32 and if desired, the intensifier can be discontinued. Check valve 41 is arranged so that pressure from the intensifier 29 cannot flow into the test water system through pipe 40. Upon completion of the operation, air pressure may be applied to line 42 and line 30 vented so that the piston in cylinder 31 will move upwardly and valve 38 will be opened.

Normally, the pressure testing fluid is supplied by a separate hydraulic intensifier. It is apparent that the main intensifier could be connected directly to the passage 19, or that the sealing intensifier 29 can be operated independently of the main pressure intensifier and maintained at a higher pressure.

It is evident that variations may be made in the illustrated details without departing from the spirit of the invention except as defined in the appended claims.

I claim:

1. In a hydraulic seal arrangement for a test head of a testing machine or the like, the combination including a sealing head to receive an article to be tested, an annular ring having a plurality of segments, links interconnecting said ring segments, means holding said ring in engaging relationship with the article tested, a resilient packing to sealingly engage the article tested, said packing having a face held by said ring, and a solid ring means between such face of said resilient packing and said segmental annular ring for preventing extrusion of the packing into the spaces between said segments.

2. In a hydraulic seal arrangement for a testing machine, the combination including a holder to receive an article to be tested, a backing ring supported by said holder, said ring being composed of a plurality of segments, link plates between adjacent edges of said segments and loosely mounted thereon holding the ring in assembled relationship, a yieldable means holding said ring segments in engaging relationship with the article tested, a resilient packing ring to sealingly engage the article tested located interiorly of said backing ring relative to the pressure to be controlled, said backing ring and links holding said packing ring in place when pressure is exerted thereon and said segments substantially equally spaced relative to each other, and a solid ring means between said resilient packing ring and said segmental ring for preventing extrusion of the packing ring into the spaces between said segments.

3. In a hydraulic seal arrangement for a testing machine, the combination including a holder to receive an article to be tested, a backing ring supported by said holder, said ring being composed of a plurality of segments, link plates between adjacent edges of said segments and loosely mounted thereon holding the ring in assembled relationship, a yieldable means holding said backing ring segments in article engaging relationship with the article tested, a resilient packing ring to engage the article tested located interiorly of said backing ring relative to the pressure to be controlled, said backing ring and links holding said resilient packing ring in place when pressure is exerted thereon, a solid ring means between the resilient packing ring and the backing ring for preventing extrusion of the packing ring into the spaces between said segments, and fluid pressure connections with said resilient packing ring for causing engagement thereof with the element to be sealed.

4. In a hydraulic seal arrangement for a testing machine, the combination including a holder, an annular recess in said holder to receive an article to be tested, a resilient packing ring in said annular recess to surround and sealingly engage the article received therein, a solid backup ring outside of said resilient packing ring and having an aperture slightly larger than the largest element to be passed therethrough for forming an uninterrupted lateral support for said packing ring over substantially the entire outer face of such ring, a segmental backing ring contacting said solid backup ring composed of a plurality of segments joined in assembled relationship by loosely mounted links between the segments, said segments having surrounding yieldable means holding said segments in engaging relationship with the article tested, said segmental ring being outside of said backup ring, and a retaining member holding said resilient packing, solid backup ring and segmental ring in place in said holder.

5. In a hydraulic seal arrangement for testing machines or the like, the combination including a sealing head, a resilient packing in said head, conduit means for supplying fluid pressure thereto for urging it into sealing engagement with an article tested, means supplying test fluid pressure to an article to be tested held by said head, and a pressure intensifier selectively connectable to said conduit means for supplying fluid at high pressure to said packing at the beginning of the test cycle, and means connecting said test fluid pressure supply means to said conduit means when its fluid pressure exceeds that of the fluid pressure supplied by said intensifier.

6. In a hydraulic seal arrangement for testing machines or the like, the combination including a sealing head for receiving an element to be tested, a resilient packing in said head, conduit means for supplying pressure thereto, means supplying test fluid pressure to the element to be tested and to said resilient packing, a pressure intensifier connected through check valve means to said conduit means for supplying fluid at high pressure to said packing at the beginning of the test cycle, and check valve means in the connection of said test fluid pressure to said packing for permitting the test fluid pressure supply means to supply fluid pressure to said packing when its pressure exceeds that of the fluid pressure supplied by said intensifier.

7. In a hydraulic seal arrangement for testing machines or the like, the combination including a sealing head, a resilient packing in said head, conduit means for supplying fluid pressure thereto, a solid backup ring contacting said packing, a backing ring composed of a plurality of segments and link plates between said segments loosely mounted thereon, yieldable means holding said segments in engaging relationship with an article tested, a solid ring means between said resilient packing and the segmental backing ring for preventing extrusion of the packing into the spaces between said segments, means supplying test fluid pressure to an article to be tested held by said head, and a pressure intensifier selectively connectable to said conduit means for supplying fluid at high pressure to said packing at the beginning of the test cycle, and means connecting said test fluid pressure supply means to said conduit means when its fluid pressure exceeds the fluid pressure supply by said intensifier.

References Cited in the file of this patent

UNITED STATES PATENTS

| | | |
|---|---|---|
| 910,472 | Juggren | Jan. 19, 1909 |
| 1,788,845 | Reynolds | Jan. 13, 1931 |
| 1,800,085 | Kroeger et al. | Apr. 7, 1931 |
| 1,931,502 | Markle et al. | Oct. 24, 1933 |
| 2,255,921 | Fear | Sept. 16, 1941 |
| 2,391,121 | Bryant | Dec. 18, 1945 |
| 2,430,445 | Aamodt | Nov. 11, 1947 |
| 2,497,193 | Webb | Feb. 14, 1950 |
| 2,531,922 | Seamark | Nov. 28, 1950 |
| 2,567,243 | Smith | Sept. 11, 1951 |
| 2,610,651 | Hahn | Sept. 16, 1952 |
| 2,655,182 | Hayes | Oct. 13, 1953 |
| 2,683,982 | Lassman et al. | July 20, 1954 |

FOREIGN PATENTS

| | | |
|---|---|---|
| 439,542 | Germany | Jan. 13, 1927 |
| 351,226 | Great Britain | June 25, 1931 |